(12) United States Patent
Gasmann et al.

(10) Patent No.: US 11,511,673 B2
(45) Date of Patent: Nov. 29, 2022

(54) CONSOLE ELEMENT, SYSTEM WITH A CONSOLE ELEMENT, AND METHOD FOR CONNECTING A CONSOLE ELEMENT WITH A VEHICLE FLOOR OF A VEHICLE, AND THE MOTOR VEHICLE

(71) Applicant: Volkswagen Aktiengesellschaft, Wolfsburg (DE)

(72) Inventors: Wadim Gasmann, Calberlah (DE); Thomas Grimbach, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 236 days.

(21) Appl. No.: 17/013,458

(22) Filed: Sep. 4, 2020

(65) Prior Publication Data

US 2021/0061179 A1    Mar. 4, 2021

(30) Foreign Application Priority Data

Sep. 4, 2019   (DE) ...................... 10 2019 213 434.3
Oct. 16, 2019  (DE) ...................... 10 2019 215 944.3

(51) Int. Cl.
  *B60R 7/04*   (2006.01)
  *B60R 11/00*  (2006.01)

(52) U.S. Cl.
  CPC ......... *B60R 7/04* (2013.01); *B60R 2011/0007* (2013.01); *B60R 2011/0052* (2013.01)

(58) Field of Classification Search
  CPC ............... B60R 7/04; B60R 2011/0007; B60R 2011/0052; B60R 13/0262; B62D 65/14

USPC .................... 296/37.8, 24.34, 1.09
  See application file for complete search history.

(56) References Cited

U.S. PATENT DOCUMENTS

| | | | |
|---|---|---|---|
| 5,106,143 A * | 4/1992 | Soeters ................... | B60N 2/75 292/303 |
| 5,873,749 A | 2/1999 | Takiguchi et al. | |
| 6,510,915 B1 | 1/2003 | Meyer | |
| 6,736,438 B1 * | 5/2004 | Wieclawski ........... | B60R 11/02 296/24.3 |
| 7,004,526 B2 | 2/2006 | Herbold et al. | |
| 7,152,295 B2 | 12/2006 | Goetz et al. | |
| 7,258,381 B2 * | 8/2007 | Sturt ....................... | B60R 7/04 296/37.7 |
| 7,429,068 B2 * | 9/2008 | Busha .................... | B60R 7/04 296/37.7 |

(Continued)

FOREIGN PATENT DOCUMENTS

| | | |
|---|---|---|
| DE | 196 54 637 A1 | 7/1997 |
| DE | 100 27 020 A1 | 12/2001 |

(Continued)

*Primary Examiner* — D Glenn Dayoan
*Assistant Examiner* — E Turner Hicks
(74) *Attorney, Agent, or Firm* — Muncy, Geissler, Olds & Lowe, P.C.

(57) ABSTRACT

A console element for connection to a vehicle floor of a vehicle, having a main body having a main body base and main body side walls, and having front connectors and rear connectors that are attached in each case to an underside of the main body base and can be inserted in receptacles arranged on the vehicle floor of the vehicle by means of a horizontal movement of the main body along a joining direction, characterized in that the front connectors and the rear connectors are designed to be self-centering.

11 Claims, 13 Drawing Sheets

(56) References Cited

U.S. PATENT DOCUMENTS

| | | | | |
|---|---|---|---|---|
| 7,591,498 B2* | 9/2009 | Busha | ................... | B60N 3/101 |
| | | | | 224/281 |
| 7,810,969 B2* | 10/2010 | Blackmore | ............ | B60Q 3/229 |
| | | | | 362/555 |
| 9,505,351 B2* | 11/2016 | Middel | ................... | B60N 2/78 |
| 9,752,608 B2* | 9/2017 | Winklbauer | ............ | B60R 13/02 |
| 9,975,493 B2* | 5/2018 | Okinaga | ................... | B60R 7/08 |
| 10,703,235 B2* | 7/2020 | Jindal | ................ | B60N 2/42727 |
| 10,730,443 B2* | 8/2020 | Neumann | ................. | B60R 7/04 |
| 2005/0116488 A1* | 6/2005 | Sakakibara | ............... | B60R 7/04 |
| | | | | 296/37.8 |
| 2005/0236859 A1* | 10/2005 | Sakakibara | ............... | B60R 7/04 |
| | | | | 296/37.8 |
| 2007/0181763 A1* | 8/2007 | Babian | ................... | B60R 11/00 |
| | | | | 248/300 |
| 2013/0057010 A1* | 3/2013 | Vasko | ....................... | B60R 7/04 |
| | | | | 296/24.34 |
| 2014/0361567 A1* | 12/2014 | Singh | ................... | E05D 15/502 |
| | | | | 296/37.8 |
| 2020/0001939 A1* | 1/2020 | Gritscher | ............ | B60R 13/0262 |
| 2022/0097613 A1* | 3/2022 | Booth | ..................... | E05B 85/10 |
| 2022/0185201 A1* | 6/2022 | Telesco | ............... | B60R 13/0262 |

FOREIGN PATENT DOCUMENTS

| | | |
|---|---|---|
| DE | 102 60 504 A1 | 7/2004 |
| DE | 103 23 999 B4 | 9/2005 |
| DE | 10 2007 020 157 A1 | 10/2008 |
| DE | 10 2010 001 449 A1 | 8/2011 |
| DE | 10 2010 041 048 A1 | 3/2012 |
| DE | 10 2017 107 105 A1 | 10/2018 |
| EP | 2 065 249 A1 | 6/2009 |

* cited by examiner

CONSOLE ELEMENT, SYSTEM WITH A CONSOLE ELEMENT, AND METHOD FOR CONNECTING A CONSOLE ELEMENT WITH A VEHICLE FLOOR OF A VEHICLE, AND THE MOTOR VEHICLE

This nonprovisional application claims priority under 35 U.S.C. § 119(a) to German Patent Application No. 10 2019 213 434.3, which was filed in Germany on Sep. 4, 2019, and to German Patent Application No. 10 2019 215 944.3, which was filed in Germany on Oct. 16, 2019, and which are all herein incorporated by reference.

BACKGROUND OF THE INVENTION

Field of the Invention

The present invention relates to a console element for connecting with a vehicle floor of a vehicle, having a main body comprising a main body base and main body side walls, and having front connectors and rear connectors which are each arranged on an underside of the main body base and can be inserted in receptacles disposed on the vehicle floor of the vehicle by means of a horizontal movement of the main body along a joining direction. The invention also relates to a system comprising such a console element, a front mounting bracket and a rear mounting bracket, and a method for connecting a console element to a vehicle floor of a vehicle. The present invention is supplemented by a motor vehicle including the console element or the system according to the invention.

DESCRIPTION OF THE BACKGROUND ART

Nowadays, the final assembly of vehicles is already automated to a certain extent and is accordingly partly carried out by automatic robots on an assembly line. The majority of the assembly work continues to be done by human assembly workers. The reasons for this are relatively diverse. On the one hand, a large part of the work is carried out inside the body of the vehicle, which makes it difficult for a robot to access whose base is located outside the vehicle body. Furthermore, automated production that has the necessary accuracy and complies with the corresponding tolerances is very complex when it comes to sensors and control technology, so that the use of human workers for many process steps is currently safer and cheaper.

In the area of the center console in particular, there has been no significant automation in automobile production. The center console is a relatively large component which may also be constructed in a complex manner, and usually comprises a plurality of single elements, such as storage compartments, ventilation elements, operating elements and lighting elements. Since the center console is located in the center of the vehicle and thus directly in view of the user, possible manufacturing tolerances are relatively few when it comes to ensuring a visually appealing clearance.

The center consoles known from the prior art as well as methods for fastening the center consoles to the vehicle floor all require the support of a human worker for precise positioning. For example, a center console is known from U.S. Pat. No. 5,106,143, comprising a front plate-shaped connector which can be inserted in a corresponding clamping element fixed on the vehicle floor and then engages there. After the front connector has engaged, a pivoting movement is carried out around the front connector, as a result of which two further connectors projecting downwards in the rear area snap into corresponding receptacles fixed on the vehicle floor. The method is at most conditionally suitable for automation, since the positioning of the center console to be installed, in particular transversely to the direction of travel, has to be set and monitored extremely precisely so that proper engagement of all connectors is ensured.

US 2005/0236859 A1 describes a console element, which has clip elements on its underside, the clip elements able to engage in accordingly designed openings that are attached to retaining clips on the vehicle floor. The clip elements are secured by pin elements attached to an inner base element. Even with the incorporation of this console element, it is necessary to precisely position and align the individual elements above one another prior to assembly.

SUMMARY OF THE INVENTION

It is therefore an object of the present invention to provide a center console, a system comprising the center console and a method for installing a center console that allow for a higher degree of automation and in particular enable high accuracy in the end positioning of the center console in the vehicle.

The object is achieved in an exemplary embodiment by a console element of the type described above, in which the front connectors and the rear connectors are designed to be self-centering. The object is further achieved by a system with such a console element, a front mounting bracket and a rear mounting bracket, and by a method for connecting a console element to a vehicle floor.

In addition, a motor vehicle with the center console or the system comprising the center console is made available.

A first aspect of the invention is a console element for connection to a vehicle floor of a vehicle, having a main body comprising a main body base and main body side walls, and having front connectors and rear connectors, each of which are arranged on an underside of the main body base and which can be inserted in receptacles arranged on the vehicle floor of the vehicle by means of a horizontal movement of the main body along a joining direction, wherein the front connectors and the rear connectors are designed to be self-centering.

In particular, the console element can be equipped with a main body for connection to a vehicle floor of a vehicle, which includes a main body base and main body side walls, and can be provided with at least one front connector and at least one rear connector that are arranged on an underside of the main body base and can be inserted in receptacles arranged on the vehicle floor of the vehicle by means of a movement of the main body along a joining direction. It is provided that the front connector and the rear connector are designed to be self-centering.

The joining direction can also be referred to as the assembly direction. The self-centering effect of the respective connector relates to its respective position in relation to the respective receptacle. The movement of the main body may, in particular, take place in the horizontal direction.

The advantage of the console element according to the invention is that it can be reliably placed at a predetermined end position with a small tolerance and without the need for elaborate control mechanisms or for the console element to be very precisely handled during installation. The design of the console element itself allows for the end position to be precisely reached, although the console element can ultimately be operated with less accuracy. The console element is therefore suitable to be mounted fully automatically, for example by a robot, thus connecting it to the vehicle floor.

The front connectors and the rear connectors can be designed to be self-centering both in a horizontal direction as well as in a vertical direction. Accordingly, the final position of the console element in a horizontal direction and in a vertical direction is also determined by the shape of the console element or by the shape of the connectors. The horizontal direction, as well as the vertical direction, can in this case be aligned perpendicular to the joining direction. The position along the joining direction can be defined by a simple stop or a latching element. In particular in the vertical direction, the end position of the console element can also be defined in a simple manner by the shape of the console element, so that the position is reached by a combination of the horizontal joining movement and the force of gravity, leading to a vertical movement.

The front connectors and/or the rear connectors can be configured in such a way that a width of a receiving opening of the front connectors and/or a width of a receiving opening of the rear connectors along the joining direction decreases from a front area towards a rear area.

Accordingly, it can also be provided that the front connector and/or the rear connector can be designed in such a way that a width of a receiving opening of the respective connector along the joining direction decreases from a front area towards a rear area.

The connectors or the receiving openings of the connectors can therefore have a wedge shape. Accordingly, the respective receiving openings of the connectors, viewed along the joining direction, are smaller in cross section in a front area than in a rear area. In other words, the receiving openings taper towards the rear area, so that they can be introduced with the front end, for example, in an opening having a size that corresponds to a cross section of the corresponding connector in a rear area.

Alternatively or additionally, the connectors themselves may also be designed wedge-shaped, in which case the cross section or the width of the connector increases from a front area to a rear area. The connectors can then be inserted in a receptacle available on the vehicle floor, wherein the possible play of the connector within the receptacle is reduced during the joining process.

The insertion into the opening permits a relatively large inaccuracy in the introductory movement, since the opening is significantly larger than the cross section of the connector in the front area. During the joining movement, an outer surface of the connector then slides along an edge of the opening if the connector was not introduced exactly centrally in the opening from the start, such that the entire console element is moved transversely to the assembly direction and is thus centered.

The receiving openings of the connectors may be configured such that corresponding fasteners arranged on the vehicle floor or on a structure disposed on the vehicle floor, for example on the front and/or rear mounting brackets, can penetrate into the receiving openings during a joining movement, so that a form-fitting and/or frictional connection is produced between the connectors arranged on the console element and the fasteners disposed on the vehicle floor. Alternatively, the receiving openings can of course also be arranged on the vehicle floor and be designed as already described above. The result is then also the self-centering effect.

The connectors may be configured such that the width of the receiving openings decreases continuously at least in sections. The receiving openings may, for example, be wedge-shaped or funnel-shaped or be shaped like a keyhole.

The front connectors and/or the rear connectors increase in their vertical extent along the joining direction, so that during a joining process a self-centering of the console element is performed in a vertical direction. This can be achieved by the fact that during the joining process, a vertical play between the connectors arranged on the console element and the connectors disposed on the vehicle floor is reduced. The connectors arranged on the console element can ride up on the connectors arranged on the vehicle floor during the horizontal joining movement.

In general, the center console can be designed in such a way that the front connectors and/or the rear connectors substantially increase along the joining direction in their extent perpendicular to the joining direction, so that during a joining process, the console element is self-centered in a direction that is substantially perpendicular to the joining direction.

The joining process can also be referred to as an assembly process.

Middle connectors can be arranged in a middle area of the underside of the main body base, which are designed to be similar to the front connectors and/or similar to the rear connectors. This way, due to the additional connectors, a more secure connection between the console element and the vehicle floor can be achieved.

This means that the central connector can also be disposed on the underside of the main body base and can be inserted in a receptacle arranged on the vehicle floor of the vehicle by means of a movement of the main body along a joining direction or assembly direction, wherein the middle connector is configured to be self-centering with regard to its respective position in relation to the receptacle.

The console element can have receptacles for screws, or, generally, for mechanical connectors, via which the console element can be fixed to a vehicle floor, each receptacle having a passage direction, and wherein the receptacles are aligned in such a way that all the passage directions of the receptacles are parallel to one another. In this case, a plurality of screws or all screws can be fastened at the same time, without the need for a tool or a plurality of tools machining from different directions.

The console element can have at least one screw, or, generally, a mechanical connector, which for example connects a plurality of individual parts of the console element and is simultaneously set up to fix the console element to the vehicle floor. This way, the number of steps that are necessary for fastening the console element to the vehicle floor is reduced since the number of screws that need tightening is reduced. The potential assembly time is thus shortened. In other words, in this embodiment, a plurality of individual components are threaded onto a relatively long screw and at the same time fixed by tightening the screw. The screw can in this case also penetrate the individual component of the console element arranged at the bottom and fix all the threaded components together to the vehicle floor.

To achieve a secure fit of the console element in the predetermined end position, the console element may be configured such that the connectors include latching elements. Upon reaching the end position, the connectors can then engage in appropriately designed corresponding receptacles or other connectors or fasteners provided on the vehicle floor or on the mounting brackets disposed on the vehicle floor.

The console element comprises an electrical cable, which includes an electrical connector in the form of a plug or a socket, which is oriented along the joining direction, and which is held by a holder which is designed such that the electrical connector can be moved in a horizontal direction and/or in a vertical direction in a small area.

The console element can have an electrical cable that is connected to an electrical connector in the form of a plug or a socket, which is aligned along the joining direction and which is held by a holder designed such that the electrical connector can be moved at least in a direction extending transversely to the joining direction in a range of at least 1 mm.

It is thus possible, besides the mechanical connection between the console element and the vehicle, to establish an electrical or electronic connection.

For this purpose, a configuration according to which the electrical connector is held by a holder designed such that the electrical connector is movable in a horizontal direction and/or in a vertical direction in a small area is particularly suitable. In particular, if the electric connector is simultaneously configured such to cooperate with corresponding guide elements so as to self-center during the joining movement, such a configuration is suitable to automatically install the console element in the vehicle with the aid of a robot, thereby automatically establishing the electrical connection. The mobility of the electrical connector, for example a plug or a socket, in this case may be at least 1 mm, preferably at least 2 mm and particularly preferably at least 4 mm in all directions transverse to the joining direction.

Another aspect of the present invention is a system comprising an inventive console element, wherein the receptacles are formed by a front mounting bracket and a rear mounting bracket for connecting the console element to a vehicle floor of a vehicle. It is provided that at least one of the two components of front mounting bracket and front connector, or rear mounting bracket and rear connector, each have guide surfaces which cooperate with the respective other component so that during a joining process, the console element self-centers.

In addition, the object is achieved by the provision of an inventive system with an inventive console element, wherein the receptacles are formed by a front mounting bracket and a rear mounting bracket for connecting the console elements to a vehicle floor of the vehicle, wherein the front mounting bracket and the rear mounting bracket each have guide surfaces that cooperate with the respective front connectors of the console element or the rear connectors of the console element in such a way that during a joining process, the console element substantially self-centers along the joining direction (x).

In particular, the position of the console element is self-centered relative to the vehicle floor of the vehicle.

For this purpose, the mounting brackets can be designed individually or respectively in such a way that the opening into which the connectors of the console element are inserted is designed to be three-dimensional with corresponding guide surfaces. For example, guide elements may be present which have inner surfaces, which extend at an angle, preferably at an acute angle, for example at an angle between 5° and 40° with respect to the joining direction. The connectors of the console element can then slide down on these guide elements, so that the previously mentioned self-centering is performed.

According to a development of the system according to the invention, the front mounting bracket and/or the rear mounting bracket comprises a holder for a second electrical connector that is complementary to the electrical connector of the console element. At the same time, the holder can contain guide elements for centering the electrical connector of the console element during the joining process. The system then allows for an electrical cable to be fully automatically plugged during the joining process.

An inventive method for the connection of a console element, in particular a console element according to the invention, with a vehicle floor, comprises the steps of: connecting an upwardly open main body module, having connectors on an underside of the main body module, for the connection of the main body module at least indirectly to the vehicle floor by performing a horizontal joining movement along a joining direction; establishing an electrical connection between at least one cable arranged in the main body module and a cable disposed in the vehicle; and/or connecting an inner module, which includes at least a storage compartment with a storage compartment floor, with the base module, wherein the storage compartment floor is in the vicinity of the main body base after joining.

The main body module can be indirectly connected to the vehicle floor.

The advantage of such a method is that the console element can be mostly modularized without any difficulties occurring in the wiring or electrical supply of existing consumers. Thus, for example, the main body module can be a module as the one described above and be attached to the vehicle floor with the aid of self-centering connectors. Before the inner module is inserted, plug connections can be manufactured or other cable work performed. Due to the fact that the storage compartment is not installed together with the main body module, enough space remains to perform the abovementioned electrical work. The storage compartment has a depth which occupies a large part of the main body module height.

Another aspect of the present invention is a motor vehicle, for example, a passenger vehicle, which comprises a console element according to the invention or comprises a system according to the invention having a console element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
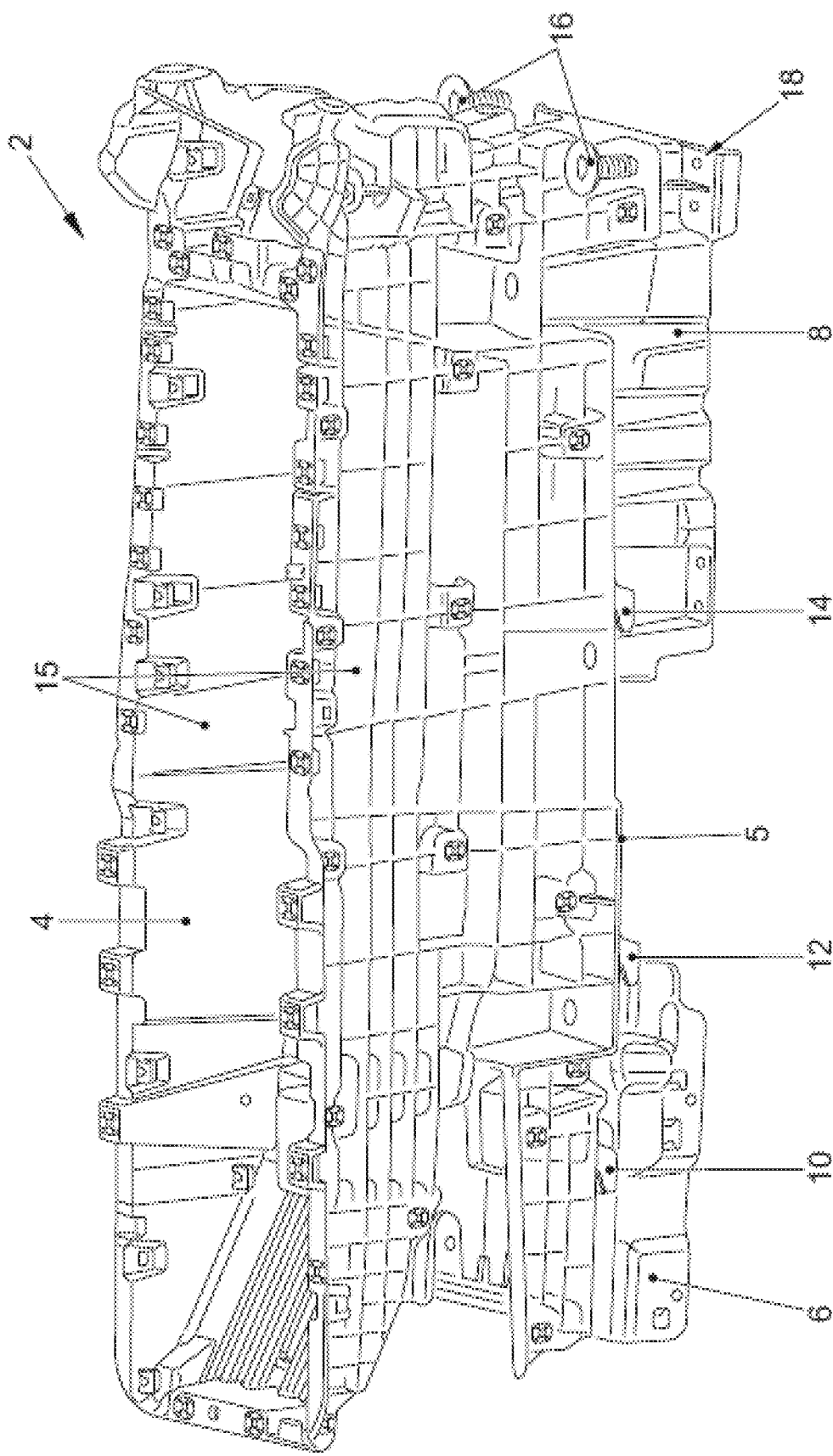
FIG. 1 shows an exemplary embodiment of a console element according to the invention.

FIG. 1 shows an exemplary embodiment of a console element 2 according to the invention in the form of a center console in a schematic view obliquely from above. The center console has a main body 4 which is made from a plastic. The main body 4 has side walls 15 and a main body base 5. A front connector 10, a middle connector 12 and a rear connector 14 can be seen on the underside of the main body base 5. These protrude like a projection downward from the main body base 5 and are arranged on the left underside of the center console in the illustrated embodiment. Similarly, corresponding connectors are also present in the right edge area on the underside of the center console, but these are not visible due to the perspective selected in FIG. 1.

Also visible are a front mounting bracket 6 and a rear mounting bracket 8, which are each firmly connected to the vehicle floor. The connectors 10, 12 and 14 engage in receiving areas of the mounting brackets 6, 8 and thus achieve a form-fitting connection of the center console with the mounting brackets 6, 8. In the rear area of the center console or its main body, two screws 16 are shown, which reach through corresponding recesses or passages in the main body 4 and which can be attached to the rear mounting bracket 8. For this purpose, the holes 18 are provided in the rear mounting bracket 8. These can either be designed in such a way that the screws 16 can engage in them and be fastened to them, or the holes 18 can be designed as pure through-holes so that the screws 16 can be anchored directly to the vehicle floor.

Figure 2:
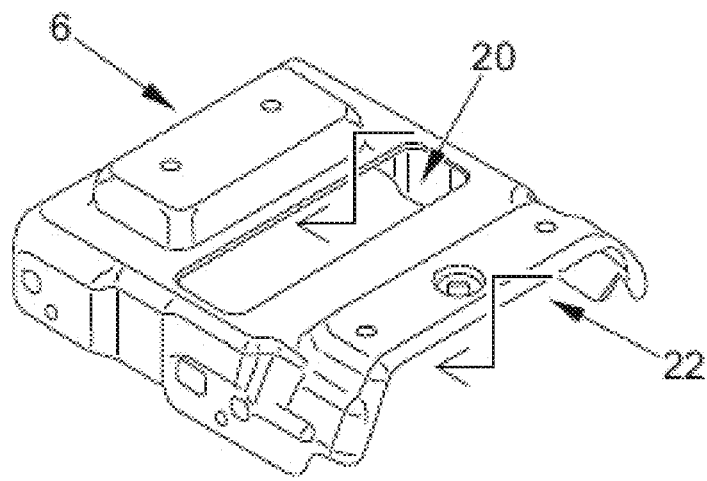
FIG. 2 shows a front mounting bracket in an enlarged view.

FIG. 2 shows a front mounting bracket 6 in an enlarged view without the center console. The front mounting bracket 6 has a profile that roughly corresponds to an inverted U. In the center region of the front mounting bracket 6, a recess 20 is arranged, in which the front connectors of the center console can engage. The profile of the front mounting bracket 6 is open towards the rear, so that a rear opening 22 is created here, in which in turn connectors of the center console can engage. The two roughly S-shaped arrows illustrate how the connecting process takes place kinematically. The two arrows describe the movement that the connectors and therefore the entire center console perform.

In a first moving portion, a forward movement, i.e. to the top left in the figure, is performed to position the connectors above or diagonally in front of the recesses or openings 20, 22. In a second moving portion, the center console is then lowered vertically and then again moved in the joining direction up to a stop, the connectors now engaging in the recess 20 or in the opening 22. The joining direction again corresponds to the forward movement, i.e. normally the travel direction of the vehicle.

Figure 3:
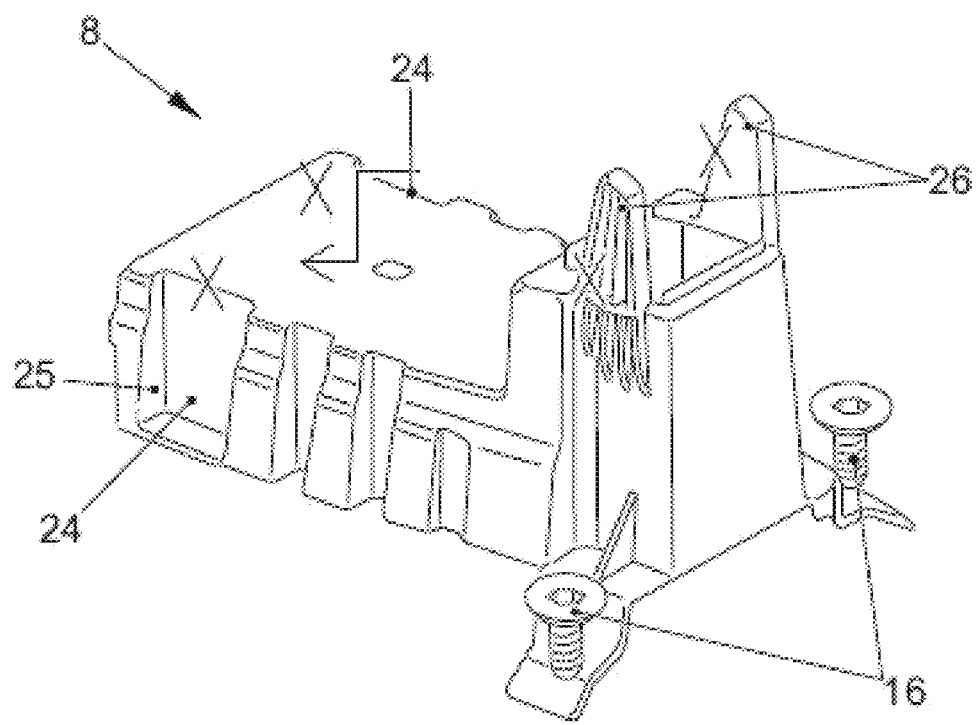
FIG. 3 shows a rear mounting bracket in an enlarged view.

FIG. 3 shows a rear mounting bracket 8 in an enlarged view without the center console. The rear mounting bracket 8 has a roughly box-like basic shape and extends from the floor of the vehicle with substantially perpendicular side walls. Again, the two screws 16 are shown with which the rear mounting bracket 8 is fixed to the vehicle floor. Further, in the front region of the rear mounting bracket 8, two depressions 24 having vertically extending walls can be seen in which the connectors can engage from above. Here, too, the arrow describes a possible sequence of movements of the rear connectors during the joining process. The movement is carried out analogously to the movement described with reference to FIG. 2. The depressions 24 can have a front wall 25 that is contoured or is provided with an opening, so that the front area of the connector can engage there and the center console can be fixed in this way.

Figure 4:
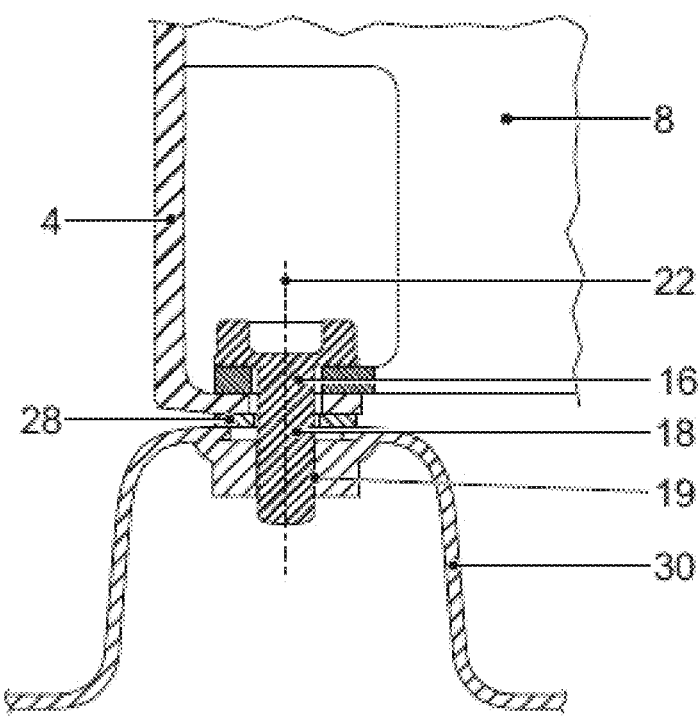
FIG. 4 shows an exemplary embodiment of a console element according to the invention.

FIG. 4 shows a schematic section of a second exemplary embodiment of a console element according to the invention, in which a possibility for connecting the console element to the vehicle shell 30 is shown. The central connector here is the screw 16, which penetrates both the main body 4 of the center console as well as the rear mounting bracket 8 and the vehicle or body shell 30, which in this case includes a floor panel. The screw 16 penetrates the hole 18 arranged in the rear mounting bracket 8 and a corresponding hole arranged in the body shell 30 and is then fixed with the nut 19. The screw 16 can be temporarily attached to the main body 4 by a clamping washer 28 prior to final assembly.

Figure 5:
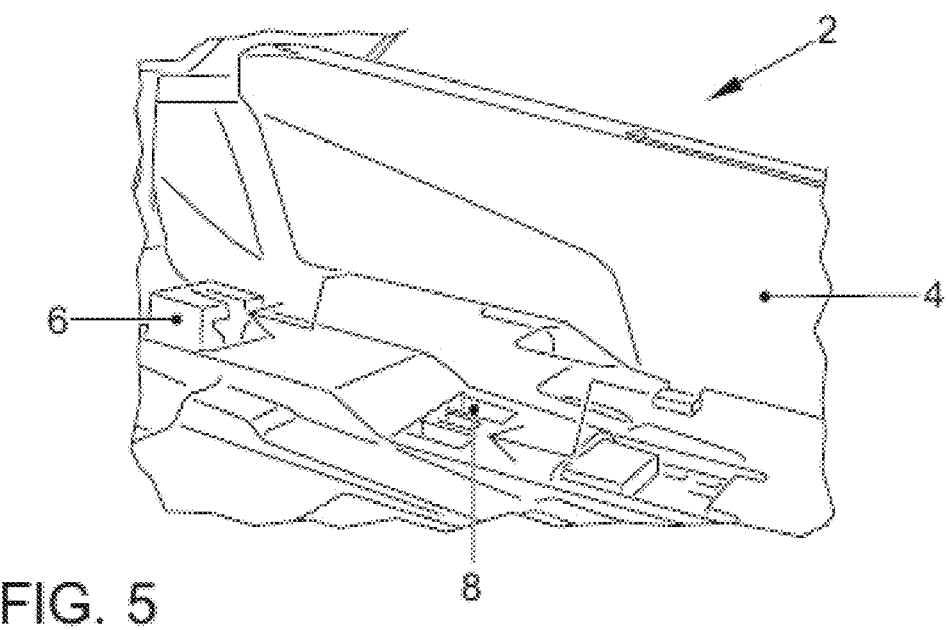
FIG. 5 shows an exemplary embodiment of a console element according to the invention.

FIG. 5 once again illustrates the sequence of movements that the center console executes when it is connected to the vehicle. The arrows again show the three-part movement that is formed of a first moving portion in the horizontal direction in the joining direction, a second vertical moving portion in which the center console is lowered, and a third moving portion, again in the horizontal direction along the joining direction. In the last moving portion, the connectors arranged on the underside of the main body 4 engage in corresponding receptacles arranged on the vehicle floor.

Figure 6:
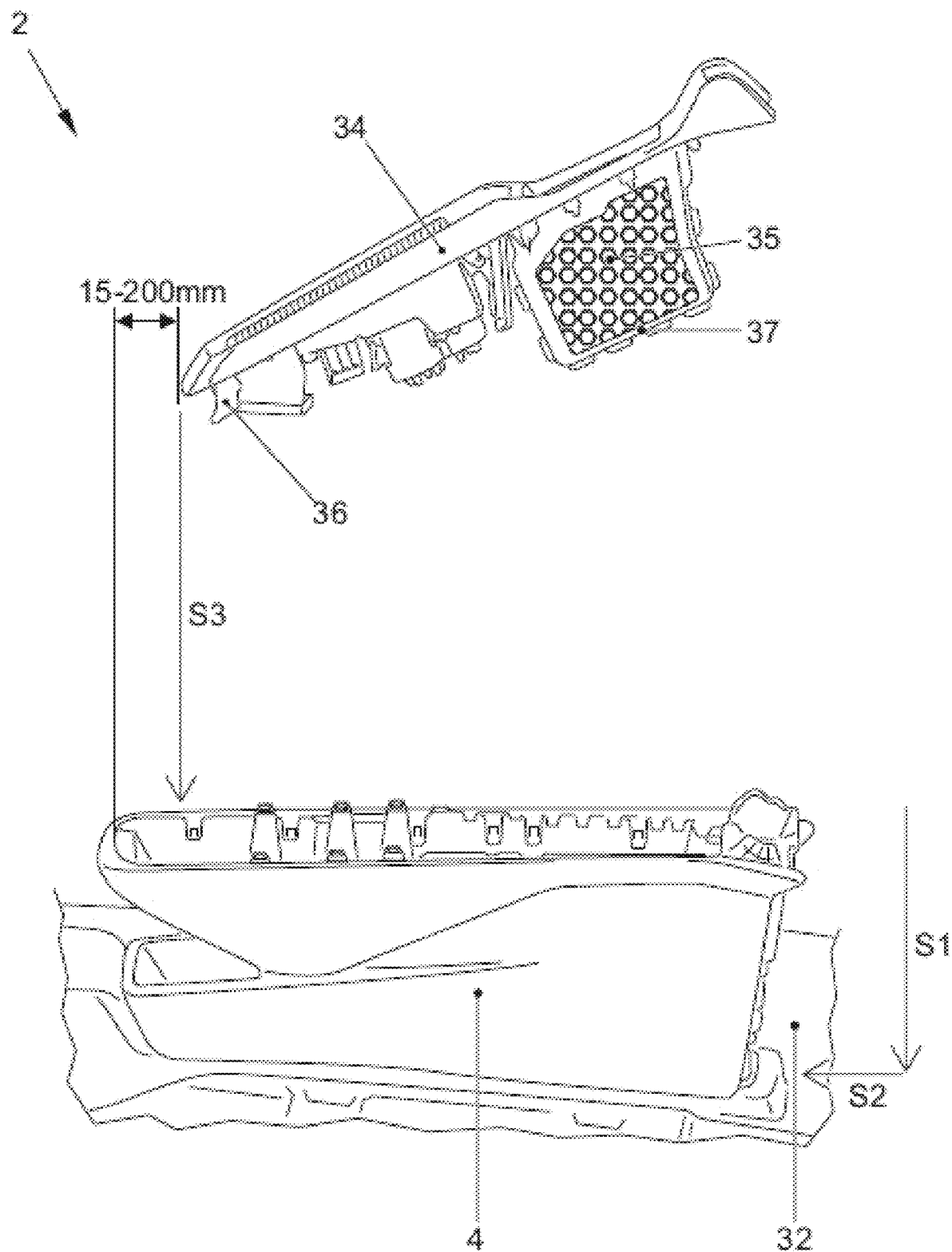
FIG. 6 shows an exemplary embodiment of a console element according to the invention.

FIG. 6 shows a fourth exemplary embodiment of a console element 2 according to the invention in which the main body 4 is already mounted and an inner module 34 is inserted. Steps S1 and S2 have already been carried out analogously to the previously described first and second moving portions. In step S1, after a rough positioning above the end position, the main body 4 was lowered and then pushed horizontally forward in step S2 so that the connectors have connected in a self-centering manner with the vehicle floor 32 or with the front and rear mounting brackets arranged thereon. The inner module 34 has a storage compartment 35 which, in the illustrated embodiment, is arranged in the rear area of the inner module 34. It is open at the top, but can also be closed by a flap, a shutter or the like. The height of the storage compartment 35 is slightly less than the height of the main body 4, so that the floor 37 of the storage compartment 34 in the installed state is arranged in the vicinity of the main body base, for example at a vertical distance of less than 10 cm from the main body base.

The inner module 34 has also been positioned roughly above its predetermined end position. It is inclined with respect to the predetermined end position. Its surface runs obliquely from the front bottom to the back top. In other words, the inner module 34 is aligned inclined, slightly forward and downward. At a front end it has front fasteners 36, which can be constructed in the same way as the connectors described above. In a step S3, the inner module 34 is now lowered with a vertical movement. The distance between a front edge of the inner module 34 and an inner front edge of the main body 4 can be between 15 mm and 200 mm, for example.

Figure 7:
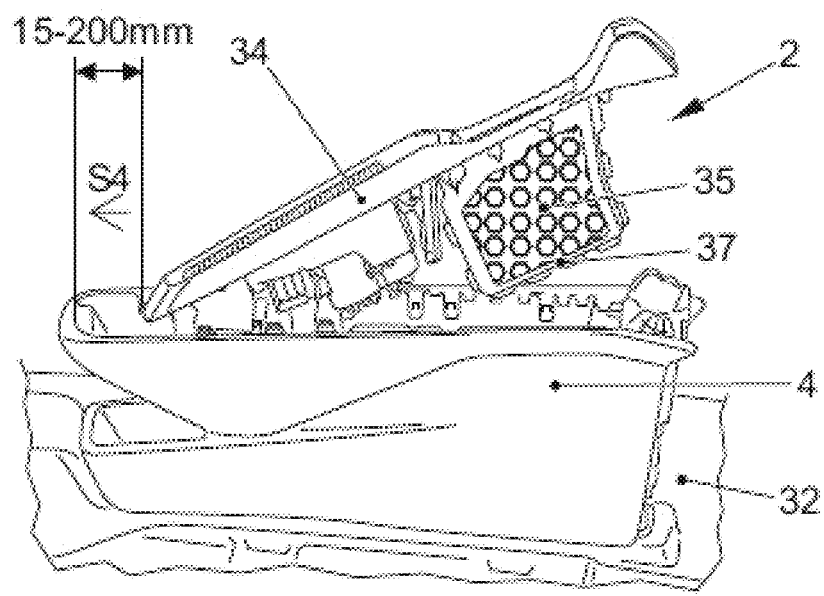
FIG. 7 shows the exemplary embodiment of FIG. 6 in an installation phase.

FIG. 7 shows the state after step S3 has been carried out. The front fasteners 36 are now arranged in front of corresponding receptacles and, together with the entire inner module 34, are inserted in these receptacles in a horizontal movement in the joining direction. The stroke of this joining movement in step S4 can be, for example, between 15 and 200 mm.

Figure 8:
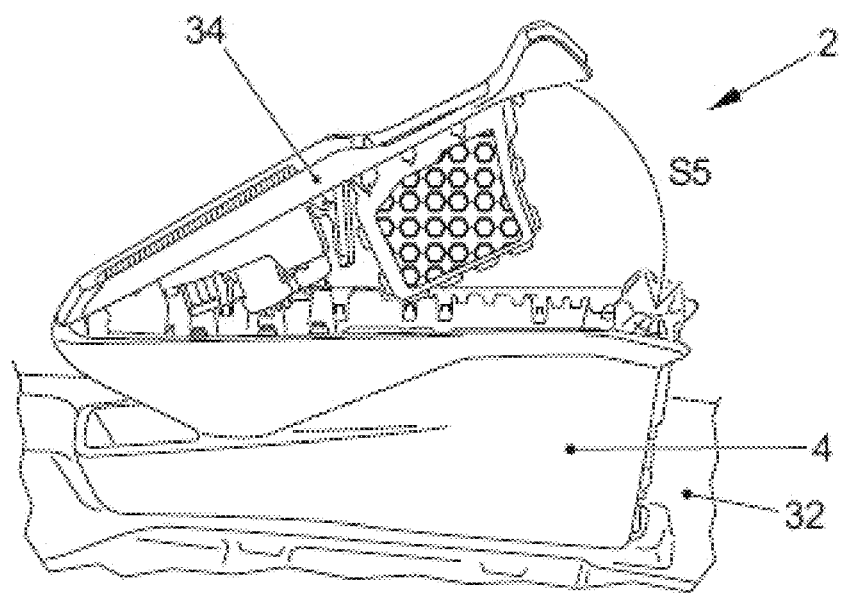
FIG. 8: shows the exemplary embodiment of FIG. 6 in a final installation phase.

FIG. 8 shows how, in step S5, a pivoting movement about the front fasteners now connected to the main body 4 is carried out. At the end of the pivoting movement, the surface of the inner module 34 reaches a horizontal orientation and thus its end position. The rear area of the inner module 34 can be connected to the rear area of the main body 4 with a latching or snap connection. Other fastening methods such as screws or adhesive are conceivable.

Figure 9:
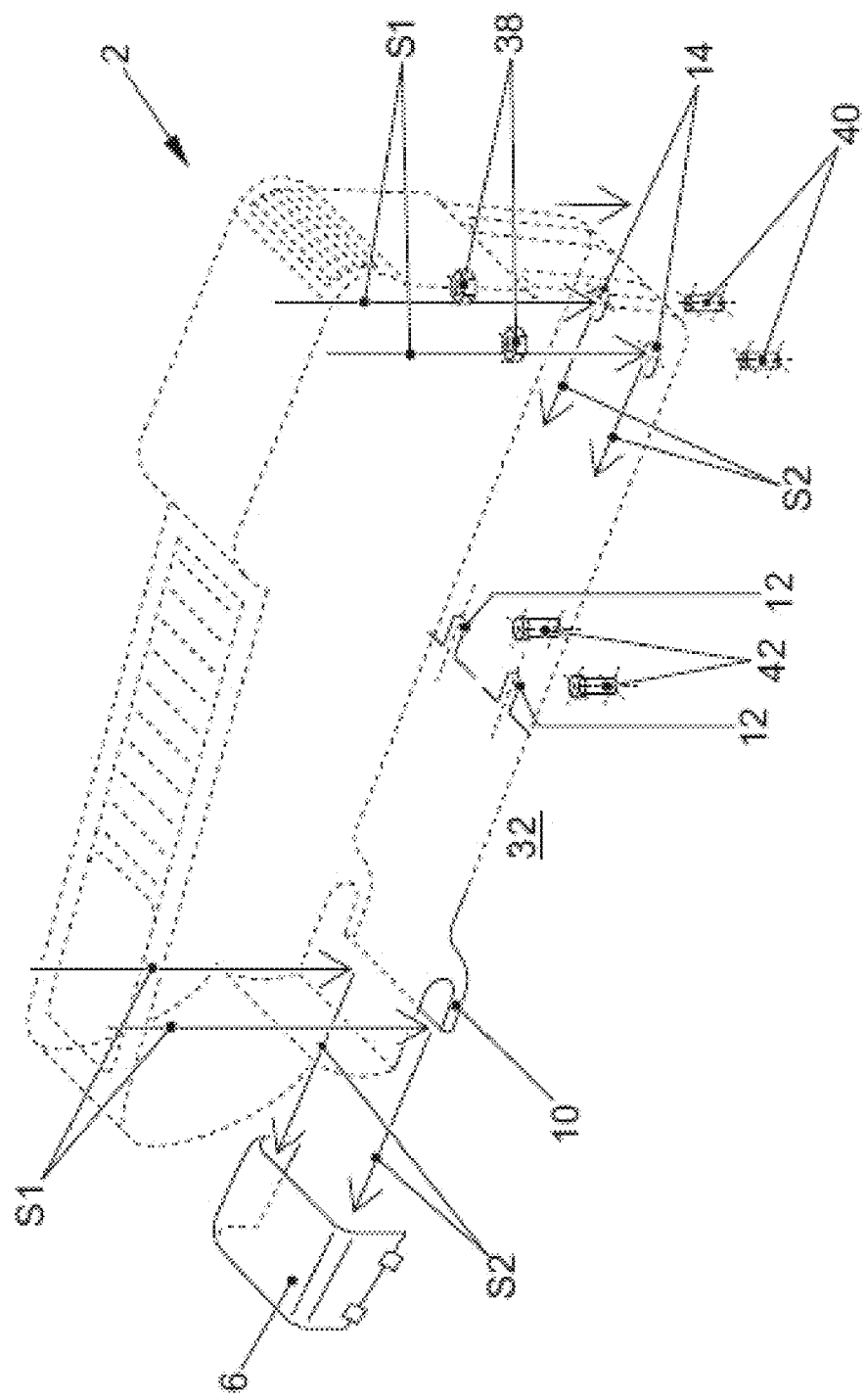
FIG. 9 shows an exemplary embodiment of a console element according to the invention.

FIG. 9 shows a fifth embodiment of an inventive console element 2 in a schematic view obliquely from above. A front mounting bracket 6 is arranged and fastened to the vehicle floor 32, into which the console element 2 can engage with its front connector 10 as described above. For this purpose, to illustrate the associated movement of the center console, the moving portions S1 and S2 are shown as arrows. The front connectors 10 are designed hook-shaped.

The middle connectors 12 are designed as recesses in the bottom of the center console. They are open to the front and taper toward the rear so that the self-centering effect occurs when they perform a horizontal movement in the joining direction in step S2 and thus enclose the correspondingly designed T-bolts 42, producing a positive connection to the latter.

The rear connectors 14 are designed as through-holes which have an elongated hole shape and thus also allow for the horizontal movement in step S2. In step S1, the center console is lowered. The bolts 40 penetrate the through-holes. Following the horizontal movement in step S2, the nuts 38 are fastened to the bolt 40, thus fixing the entire center console to the vehicle floor 32.

Figure 10:
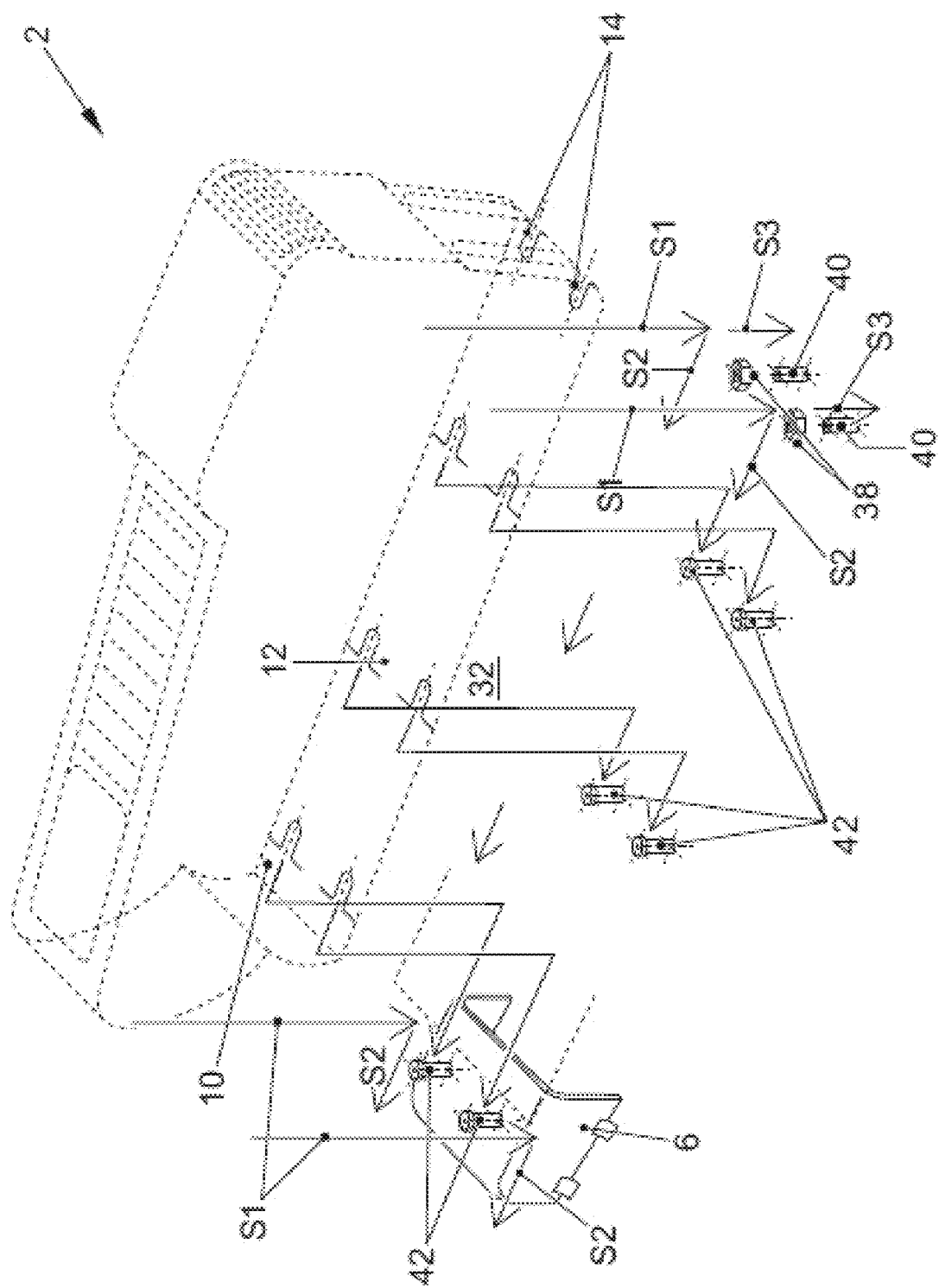
FIG. 10 shows an exemplary embodiment of a console element according to the invention.

FIG. 10 shows a sixth embodiment of an inventive console element 2, or a center console according to the invention, in a schematic view obliquely from above. The embodiment is designed similar to the embodiment shown in FIG. 9. It differs in that a total of four middle connectors 12 are present, which are arranged in pairs in different areas along the joining direction. Furthermore, the rear connectors 14 are designed to be open towards the rear. In an alternative fastening variant, the center console can initially carry out steps S1 and S2 in a position that is slightly inclined forwards. In this case, the bolts 40 do not yet penetrate the rear connectors or through-holes during steps S1 and S2. This does not happen until step S3, in which a pivoting movement is carried out, during which the rear part of the center console is lowered so that the bolts 40 now penetrate the through-holes and can then in turn be fixed with nuts.

Figure 11:
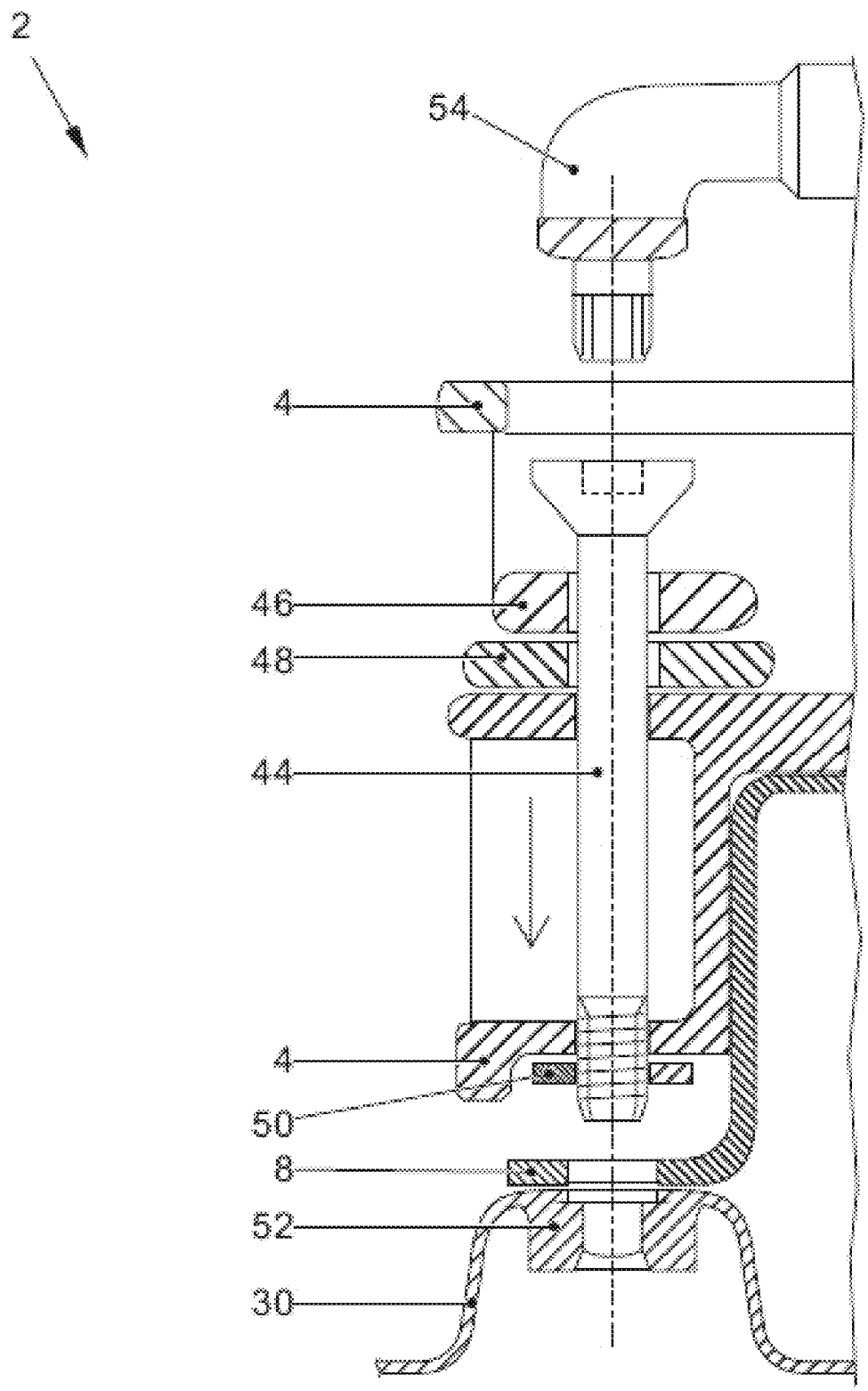
FIG. 11 shows a rear portion of a seventh embodiment of an inventive center console.

FIG. 11 shows a cross section through a rear region of a sixth exemplary embodiment of a console element 2 according to the invention or a center console. A tab-shaped portion of the body shell 30 can be seen, on which a rear mounting bracket 8 rests. Furthermore, the main body 4 is shown, which is already connected to several other components of the center console. The individual elements, namely the main body 4, an air duct 48 and an armrest 46 are connected to one another by a screw 44. The named components are pre-assembled, wherein the screw penetrates a fixing plate 50 with its tip, establishing a clamping action that connects the named components 4,46 and 48 to each other.

A situation is shown in which the center console is already engaging with its connectors in the mounting bracket and has assumed its end position. To fix the center console in this end position, the screw 44 can now be tightened with the aid of an offset screwdriver 54 while it engages in the weld nut 52, which is disposed at the bottom of the tunnel sheet of the body shell 30.

Figure 12:
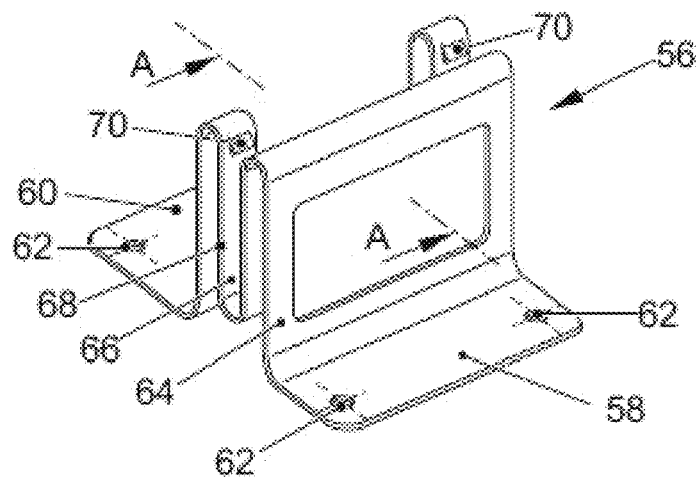
FIG. 12 shows a socket holder.

FIG. 12 shows a socket holder 56, which may be mounted to a vehicle floor or, for example, to a front mounting bracket. It can be formed of a sheet metal part that is bent or folded several times and has various recesses. The socket holder 56 has a front base tab 58 and a rear base tab 60, which are each connected to the foundation at the welding points 62. Between the two base tabs 58, 60, a plurality of vertically extending sections are arranged. The rear vertical section, as seen in the direction of travel, is the guide section 64 having a receiving opening 72 through which a cable comprising a plug can be connected to a socket held by the socket holder 56. Viewed in the direction of travel behind the guide section 64, the holding portion 66 is arranged, to which the socket can be fastened. The guide section 64 is connected to the holding portion 66 by the connecting section 68, wherein the holding portion 66 is oriented approximately horizontally.

Figure 13:
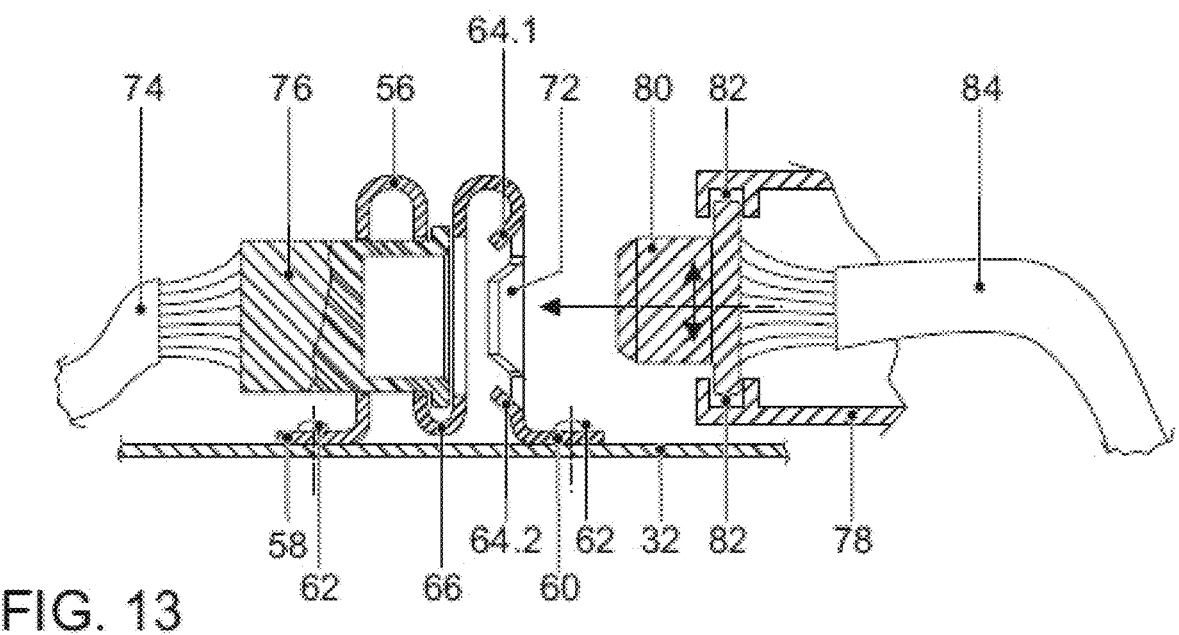
FIG. 13 shows a section of the socket holder from FIG. 12 in a side view.

FIG. 13 shows a section of the socket holder 56 from FIG. 12 in a side view. Again shown are the vehicle floor 32, the socket holder 56 having a front base tab 58, a rear base tab 60 and the welding points 62, as well as a plug 80 connected to a cable 84, which is held by a plug socket 78 which is connected to the center console element. The socket holder 56 carries the socket 76, which in turn is connected to the cable 74. In the rear region of the socket holder 56, viewed in the driving direction, the guide sections 64.1 and 64.2 are arranged. These are inclined inwardly so that the plug 80, when moved to the left in the figure during the joining movement, is centered and accurately inserted into the socket 76.

The plug 80 is held by the plug socket 78, the plug having a certain amount of play, which is made possible by the free spaces 82, which can be seen above and below the plug 80 in the section shown. The plug 82 can thus be centered independently of the rest of the center console, since it can perform a compensating movement perpendicular to the joining direction during the joining process.

Figure 14:
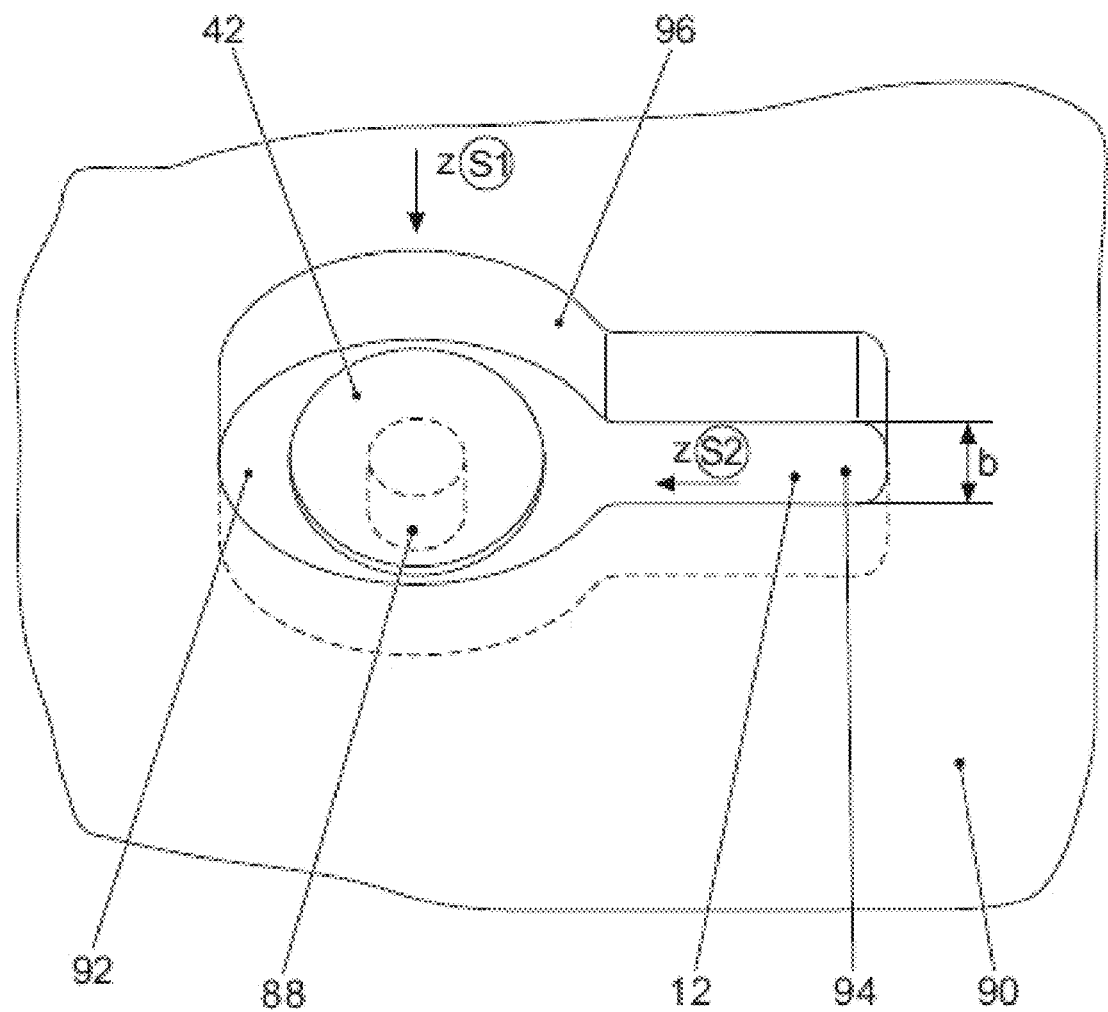
FIG. 14 shows a section of a base element of the console element according to the invention.

FIG. 14 shows a section of a base element 90 of a console element according to the invention. A rear connector 14 in the form of an approximately keyhole-shaped recess can be seen in the base element 90. The recess includes an oval first recess portion 92 and a second recess portion 94 with the width b. During assembly of the center console, the first recess portion 92 is positioned over the head 86 of the T-bolt 42. This positioning can be done with relatively low accuracy, since the diameter of the first recess portion 92 is larger than the diameter of the second recess portion 94. In a first step S1, the center console is then lowered together with the connector 12 so that the head 86 of the T-bolt 42 penetrates the first recess portion 92 and is then located above the surface of the base element 90.

In a second step S2, the center console is then pushed in the joining direction x, wherein the cylindrical pin body 88 of the T-bolt 42 penetrates the second recess portion 94. The width b of the second recess portion 94 is slightly greater than the diameter of the pin body 88 so that the latter is fixed in the recess portion with very little play. The connector 12 is also fixed in the vertical direction z, since the length of the pin body 88 is slightly greater than the thickness of the base element 90.

Figure 15:
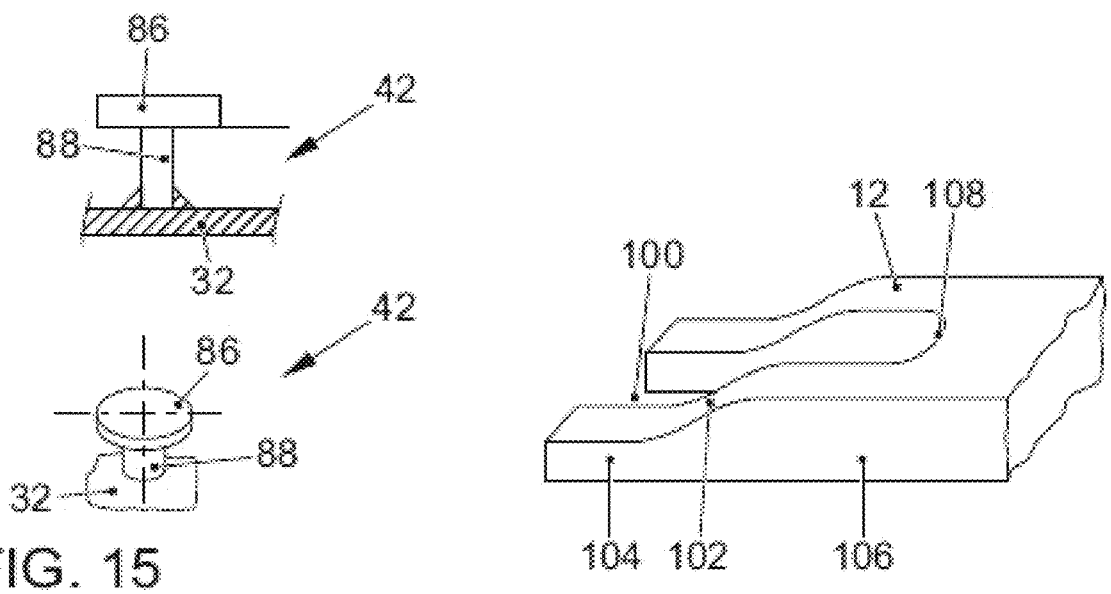
FIG. 15 shows an exemplary embodiment of such a connector.

FIG. 15 shows a further embodiment of a connector 12 according to the invention. The connector 12 has the shape of a receiving opening 100 in the form of a slot which is forwardly open and tapers rearward. This can receive the pin body 88 of the T-bolt 42 during the joining movement. The upper surface 102 of the connector 12 has a central section rising towards the rear. In other words, the thickness of the connector 12 increases from a front area 104 to a rear area 106. During the joining movement, the T-bolt 42 rides up with its head 86 on the upper surface 102 of the connector 12 until it abuts the rear stop 108 with its pin body 88. Because the head 86 of the T-bolt 42 rides up on the upper surface 102 of the connector 12, the vertical position of the connector 12 relative to the T-bolt 42 and thus also to the vehicle floor 32 is then well defined.

In the upper left region of the figure, a side view of such a T-bolt 42 is also shown. As already described, the T-bolt 42 essentially is formed of a pin body 88 and a head 86. The T-bolt 42 is disposed on the vehicle floor 32 and extends vertically upwardly therefrom.

Figure 16:
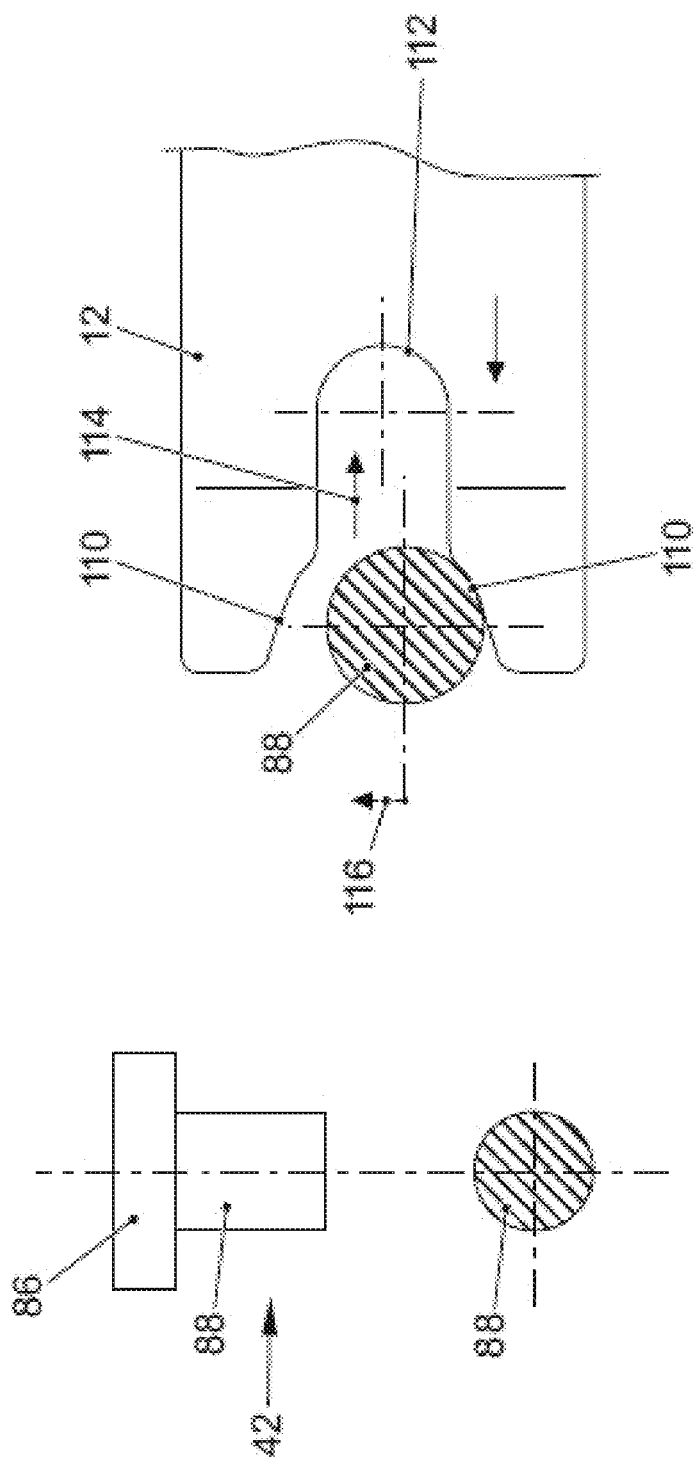
FIG. 16 shows the connector from FIG. 15 in a sectional plan view.

FIG. 16 shows the exemplary embodiment of the connector 12 from FIG. 15 in a sectional plan view, and, in the upper left area, again a side view of the T-bolt 42. The section is cut at a height below the head 86 of the T-bolt 42 so that only the pin body 88 is visible. In the right area of the figure, a situation is shown during installation of the console element. Currently, Step S2 is being carried out, i.e. the console element has already been lowered and is now being moved horizontally in order to establish a connection between the connectors and the mounting brackets.

Here, the connector 12 has already made contact with the pin body 88. The pin body 88 rests on the left guide surface 110 shown at the bottom in the figure. It can be seen that at the start of the movement transverse to the joining direction, the center console was not precisely positioned so that the pin body 88 enters the opening of the connector 12 off-center. The pin body is received by the two guide surfaces 110, which together form a funnel-shaped opening, and performs a small movement 116 relative to the connector 12 and transverse to the joining direction. In reality, this movement is of course performed by the entire center console in the opposite direction. After centering, the pin body 88 can then move unimpeded inside the opening of the connector 12 up to the rear stop 112 and take up its final position there.

Figure 17:
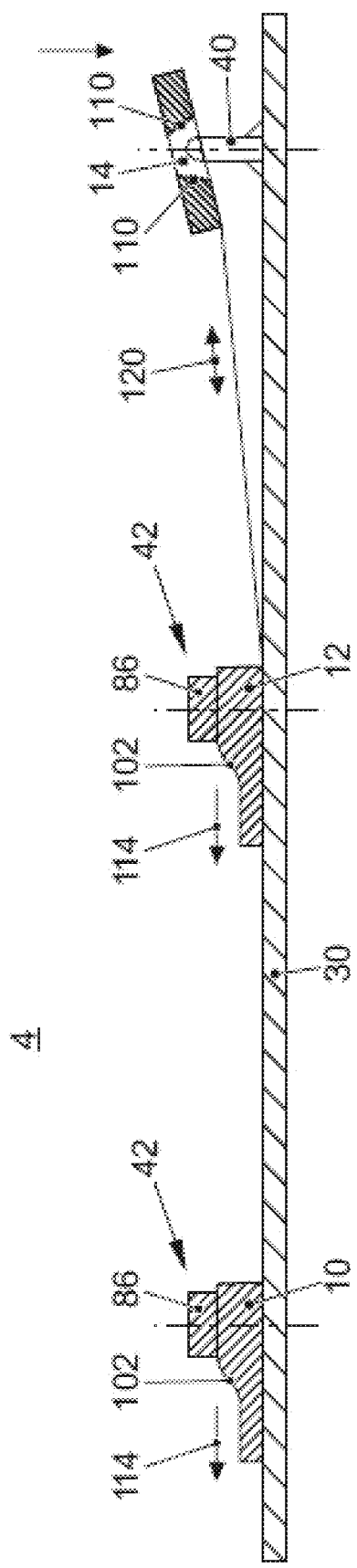
FIG. 17 shows the connector from FIG. 15 in a sectional side view.

FIG. 17 shows a sectional side view of the exemplary embodiment shown partially in FIGS. 15 and 16. The body shell 30 in the form of a tunnel sheet can be seen, on which the T-bolts 42 and the bolts 40, in the form of a weld stud, are attached. The center console is only shown in a simplified manner. It comprises the front connector 10, the middle connector 12 and the rear connector 14. The connectors 10 and 12 are designed in the same way and correspond to the connector shown in FIG. 15. The center console has already been lowered and moved in the joining direction by performing the insertion movement 114. Here, the heads 86 of the T-bolts 42 have ridden up on the upper surfaces 102 of the connectors 10, 12, which are slightly inclined relative to the joining direction and have therefore centered and fixed the center console in its vertical position. However, the center console has remained slightly tilted, so that the rear connector 14, substantially formed of an opening, can now be slipped over the bolt 40. The rear connector 14 here has guide surfaces 110 which are inclined relative to the vertical and which, through their interaction with the bolt 40, also cause the center console to be centered in the joining direction. The side faces of the bolt 40 slide down on the guide surfaces 110 so that in the end the desired position of the center console is established. This centering movement is shown in the figure by the arrow 120.

Figure 18:
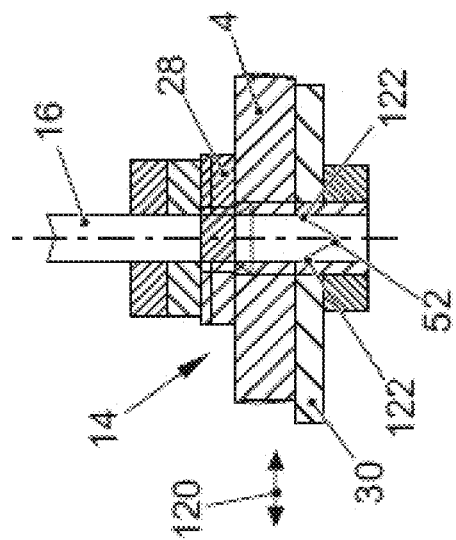
FIG. 18 shows an exemplary embodiment of the rear connector.

FIG. 18 shows an alternative embodiment of the rear connector 14. This is similar to the embodiment shown in FIG. 11. In the figure, a screw 16 can be seen which penetrates the main body 4 of the center console as well as a fixing disc or clamping washer 28. An opening is also arranged in the body shell 30 or tunnel sheet, which is penetrated by the screw 16 so that the latter can be fixed by the weld nut 52. The rear connector 14 has, in the area of the body shell 30 or in the area of the weld nut 52, likewise inclined guide surfaces 122 which center the screw 16 and thus the entire console element 2.

Figure 19:
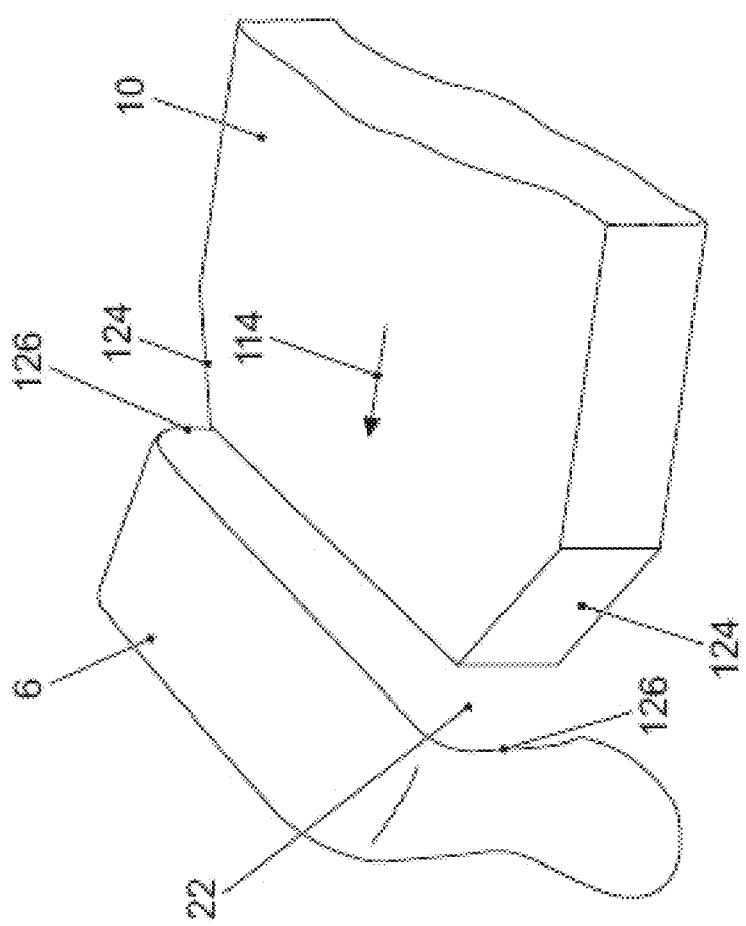
FIG. 19 shows a detailed representation of FIG. 9.

FIG. 19 shows a detailed view of the embodiment illustrated in FIG. 9. The front connector 10 is shown, which is about to penetrate the rear opening 22 of the front mounting bracket 6 by performing the insertion movement 114. The connector 10 is designed as a tab or tongue and has sloped guide surfaces 124 in the area of its front corners, which, in conjunction with the support edges 126 which are horizontally oriented and disposed on the side of the front mounting bracket 6 facing the connector 10, cause the connector 10 to self-center transversely to the joining direction. Here, one of the guide surfaces 124 comes into contact with one of the support edges 126 and slides down on this, resulting in a relative movement between the connector 10 and the front mounting bracket 6.

Alternatively or additionally, it would of course also be possible for the support edges 126 of the front mounting bracket 6, which are arranged on the side of the front mounting bracket 6 facing the connector 10, to have sloped guide surfaces which also cause the front connector 10 to self-center with the front mounting bracket 6 transversely to the joining direction.

Figure 20:
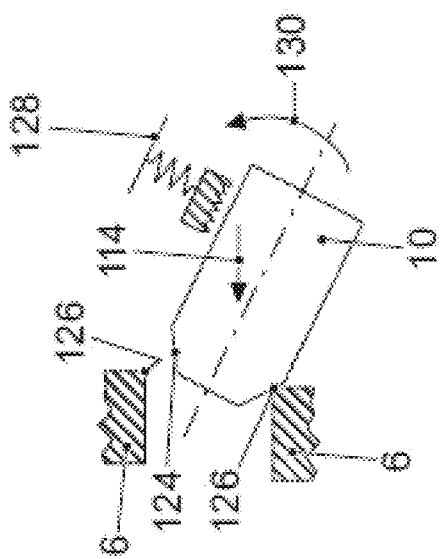
FIG. 20 shows a sectional plan view of FIG. 9

FIG. 20 shows that by means of the embodiment according to the invention, in addition to a linear self-centering movement, the alignment of the center console can be corrected using a pivoting movement or alignment movement 130. A sectional plan view of the exemplary embodiment from FIG. 19 is shown. In the illustrated situation, the central axis of the connector 10 is at an undesired angle to the central axis of the front mounting bracket 6. Through the contact of one of the guide surfaces 124 with the support edge 126, in connection with the force exerted by the gripper 128, a torque is exerted on the connector 10 and thus on the entire center console, which leads to a pivoting movement or alignment movement 130, whereby the center console is then properly aligned.

This is also carried out in an equivalent manner if the support edges 126 of the front mounting bracket 6, which are arranged on the side of the front mounting bracket 6 facing the connector 10, have sloped guide surfaces, which bring about the self-centering of the front connector 10 with the front mounting bracket 6 transversely to the joining direction.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A console element for connection with a vehicle floor of a vehicle, the console element comprising:
    a main body comprising a main body base and main body side walls;
    front connectors; and
    rear connectors, the front and rear connectors being arranged on an underside of the main body base and are insertable in receptacles arranged on the vehicle floor of the vehicle via a horizontal movement of the main body along a joining direction,
    wherein the front connectors and the rear connectors are self-centering, and
    wherein the front connectors and/or the rear connectors are configured such that a width of a receiving opening provided in the front connectors and/or a width of a receiving opening provided in the rear connectors decreases along the joining direction from a front area to a rear area.

2. The console element according to claim 1, wherein a vertical extension of the front connectors and/or the rear connectors increases along the joining direction so that during a joining process, the console element self-centers in a vertical direction.

3. The console element according to claim 1, further comprising middle connectors arranged in a middle region of the underside of the main body base, which are designed similarly to the front connectors or similarly to the rear connectors.

4. The console element according to claim 1, wherein the console element has receptacles for screws via which the console element is fixed to the vehicle floor, each of the receptacles having a passage direction, and wherein the receptacles are aligned such that the passage direction of each of the receptacles run in parallel with each other.

5. The console element according to claim 1, further comprising at least one screw connecting a plurality of individual parts of the console element to one another and to attach the console element to the vehicle floor.

6. The console element according to claim 1, further comprising an electrical cable, which has an electrical connector formed as a plug or a socket that is aligned along the joining direction and is held by a holder, which is configured such that the electrical connector is movable in a horizontal direction and/or in a vertical direction in a small area.

7. A system comprising a console element according to claim 1, wherein the receptacles are formed by a front mounting bracket and a rear mounting bracket for connecting the console element to the vehicle floor of the vehicle, wherein at least one of the front mounting bracket and the front connectors or the rear mounting bracket and the rear connectors have guide surfaces that cooperate with the respective other component such that the console element is self-centered during a joining process.

8. A system comprising a console element according to claim 1, wherein the receptacles are formed by a front mounting bracket and a rear mounting bracket for connection of the console element to the vehicle floor of the vehicle, wherein the front mounting bracket has guide surfaces cooperating with the front connectors of the console element or the rear mounting bracket has guide surfaces cooperating with the rear connectors of the console element such that the console element is self-centered during a joining process.

9. The system according to claim 7, wherein the front mounting bracket or the rear mounting bracket include a holder for an electrical connector which is complementary to an electrical connector of the console element, and wherein the holder comprises guide elements for centering the electrical connector of the console element during the joining process.

10. A method for connecting the console element according to claim 1 with the vehicle floor of the vehicle, the method comprising:
    connecting the main body, which is open at the top and has the front and rear connectors on the underside of the main body for connecting the main body to the vehicle floor, the connecting of the main body to the vehicle floor being performed by the horizontal movement of the main body along the joining direction;
    establishing an electrical connection between at least a cable arranged in the main body and a cable arranged in the vehicle;
    inserting and connecting an inner module, which comprises at least one storage compartment having a storage compartment floor, inside the main body after the main body is connected to the vehicle floor, wherein the storage compartment floor is located in a vicinity of the main body base subsequent to the inserting and connecting of the inner module inside the main body.

11. A motor vehicle comprising the console element according to claim 1.

* * * * *